Oct. 21, 1958  T. R. GRIFFITH ET AL  2,857,345
METHOD OF USING LIGNIN FOR INTRODUCING
WATER INTO VULCANIZABLE COMPOSITIONS
Filed Oct. 1, 1953
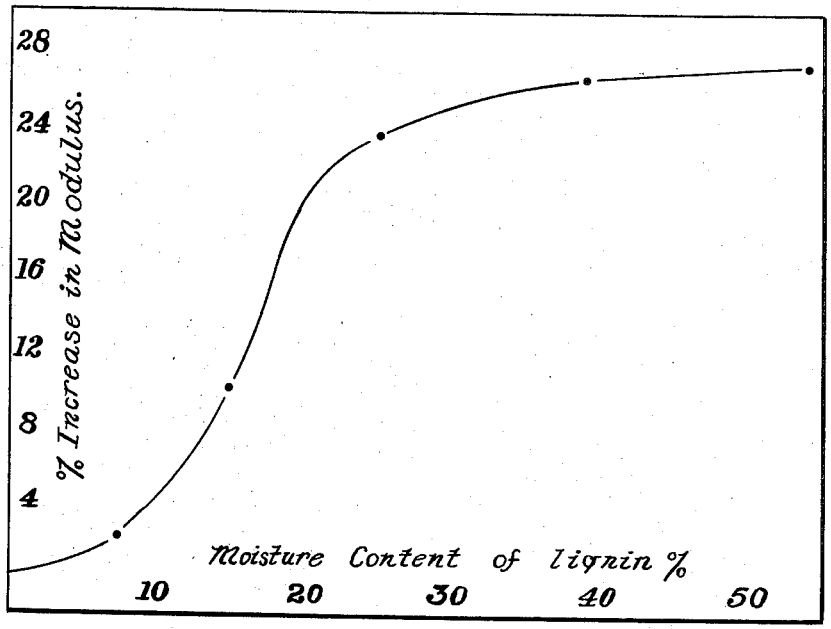
Effect of Moisture Content of Lignin on
Modulus at 300% Elongation.
Inventors
Thomas R. Griffith
Donald W. MacGregor
by Smart & Biggar
Attorneys.

United States Patent Office 2,857,345
Patented Oct. 21, 1958

2,857,345

METHOD OF USING LIGNIN FOR INTRODUCING WATER INTO VULCANIZABLE COMPOSITIONS

Thomas Raymond Griffith, Ottawa, Ontario, Canada, and Donald Wesley MacGregor, Cornwall, Ontario, Canada, assignors, by mesne assignments, to Howard Smith Paper Mills Limited, Montreal, Quebec, Canada Application October 1, 1953, Serial No. 383,618

3 Claims. (Cl. 260—17.5)

This invention relates to improvements in vulcanization and more particularly it relates to novel lignin compositions and use thereof as a means of incorporating water into vulcanizable masses. This is a continuation-in-part of application Serial No. 313,808, filed October 8, 1952.

It has long been known that the presence of water in vulcanizable masses has a pronounced effect upon the rate of vulcanization as well as upon the characteristics of the vulcanizate produced. While such effects are particularly outstanding in the vulcanization of materials which require the addition of sulphur to the formula to be vulcanized, some effect is present in all vulcanization reactions.

Although the exact mechanics of vulcanization are not fully known, it is believed that the effect of water during vulcanization can be attributed mainly to the fact that at least one ionic reaction must take place during vulcanization, which reaction will proceed more uniformly and will be greatly accelerated in the presence of water.

Various articles have been published on the subject of the effect of water upon particular vulcanization reactions among which might be mentioned that by Braendle and Wiegand, vol. 36 (August 1944), Industrial and Engineering Chemistry, No. 8, pages 724–727. This article reports an investigation into the effect of the presence of water during the vulcanization of butadiene-styrene formulations known in the trade as GR–S compounds and the authors concluded that variation in moisture content of the formulation is one of the chief reasons for the variation in curing time which had been encountered with GR–S compounds.

While it has as above mentioned been long recognized that moisture plays an important part in vulcanization reactions, the control of moisture in vulcanization formulations has in practice been found to be most difficult because of the physical characteristics of the substances into which the water must be introduced. In the above-mentioned article, for instance, Braendle and Wiegand introduced water in the carbon black. This method of introduction, however, is not satisfactory because, as is also mentioned in the article referred to, carbon black has a high affinity for water up to its natural absorptive capacity and the water which is absorbed by it is apparently fixed in such a way that it is not available to take part in the vulcanization reaction. Moisture present in excess of the absorptive capacity of the carbon is present as "wet" moisture and is subject to the usual difficulties of introduction into the formulation. Further, while it may be possible by using carbon black as a carrier for water to measure accurately the amount of water introduced to the carbon black, it has been found in practice that the length of time required to mill the formulations to uniformity, and the elevated milling temperatures encountered, will cause loss through evaporation of an indeterminable amount of water, thus making it virtually impossible to predetermine the amount of water which is actually introduced into the formulation.

The present invention has as its principal object the provision of a novel method for uniformly introducing into vulcanizable elastomer compositions an accurately predetermined quantity of water.

Various other objects and advantages of the invention will become apparent as the specification proceeds.

The present invention is based upon the discovery that certain precipitated lignins have high affinity for moisture and are capable of carrying in certain cases up to 150% of their own weight in water while retaining the physical characteristics of finely divided freely flowing dry powders which are capable of being milled into vulcanizable masses in the same manner as a normal filler. These lignins, while they will retain moisture in the above manner, are not themselves hygroscopic so that what water they carry in the above manner is water which is available to the reactions proceeding within the mass during the vulcanization process.

Not all lignin compositions which are loosely designated in the art as lignin exhibit the above properties as the physical properties of such compositions vary widely depending upon their source and the chemical treatments to which they have been subjected. Three criteria are essential in lignins which are to be used in accordance with the present invention.

(1) The lignin must be water insoluble, that is to say such soluble lignin compositions as sodium lignate, lignin sulphonate and etc. cannot be used.

(2) The lignin must be in an appropriate physical state wherein it is capable of carrying a substantial proportion of water while yet remaining a freely flowing powder.

(3) The lignin must be free of entrained acid so as not to interfere with the vulcanization reaction to which the water is to be added in accordance with the present invention.

Those lignins which we have found to be useful in accordance with the present invention are finely divided lignins isolated by precipitation from the aqueous liquors obtained from the alkaline digestion of lignocellulosic materials. Highly suitable lignins are, for instance, those prepared in accordance with the teachings of United States Patent 2,406,867 and those commercially available under the trademark "Indulin A" of The West Virginia Paper Company. The suitability of any particular lignin for use in the present invention depends primarily upon the conditions under which the lignins are precipitated and filtered from the lignin-bearing solution. However, satisfactory lignins may be prepared for use in the invention from those which are otherwise unsuitable by dissolving the lignin in alkaline solution and re-precipitating under suitable conditions as hereinafter described.

It is known in the art that the precipitation of lignin by the acidification of an alkaline solution thereof is subject to considerable difficulty unless proper conditions are observed because of the fact that if the solution is below a certain critical temperature range, called the "optimum pre-filtering range" (which varies from one lignin to the other) filtration and washing become progressively more difficult.

If the acid precipitation of the lignin is carried out at temperatures substantially lower than the optimum pre-filtering range, and the precipitated mixture is not further heated to a temperature within the optimum pre-filtering range before filtering, gelatinous type precipitates are obtained that are extremely difficult to filter and wash. In this connection it is to be noted that once having been heated to within the optimum pre-filtering range the precipitated mixture may be cooled before filtration without materially affecting its filtering characteristics. With unoxidized lignin, a temperature of 93–95° C. permits readily filtration and washing while still maintaining the desired properties in the product. It is immaterial whether this temperature is reached during or subsequent to actual precipitation, and it is not necessary, as mentioned above that this temperature be maintained until the time of filtration. If the maximum temperature before filtration is too high, the lignin will melt in contact with water even though this temperature may be materially lower than the melting point of the dry lignin. It has been found that this reduction in melting point which presumably results from water dissolved in the lignin will be as much as 80° C. or more lower than the melting point of the dry lignin. With an unoxidized lignin, it has been found that the maximum temperature before filtration should be no greater than 96° C. since otherwise the lignin will melt and coalesce.

With oxidized lignins, similar phenomena exist, but the specific temperatures are of a higher order than with unoxidized lignin. For instance, with the oxidized lignin described in Example 2 below a maximum temperature before filtration of 112° C. was found to give good filtering and washing characteristics whereas the temperature of 95° C. used for the unoxidized lignin in Example 1 would be too low and a maximum temperature of 127° C. would result in a melting of the lignin in the presence of water.

With lignins of intermediate degree of oxidation, the optimum pre-filtering range lies between the optimum filtering ranges of unoxidized lignin and that of the relatively highly oxidized lignin prepared in accordance with Example 2 and a satisfactory filtration temperature will lie somewhere between those indicated for oxidized and unoxidized lignin depending upon the particular degree of oxidation in each case.

The acid precipitation of the lignin and the preparation of the moisture-containing powder can be carried out in the following manner. The alkaline solution of the lignin is heated to a temperature of approximately 50° to 80° C. if the lignin is unoxidized, and somewhat higher, say 70° to 100° C. if oxidized. The lignin is then precipitated, under agitation, by the addition of a dilute acid such as sulfuric, or hydrochloric acid, preferably at a pH of approximately 2.5. To facilitate subsequent filtering and washing the resultant suspension may be further heated to a temperature of 80° to 95° C. with the unoxidized lignin and to 95° to 125° C. with the oxidized lignin, temperatures higher than the normal boiling point being obtained by heating at superatmospheric pressure. The precipitate is then filtered and thoroughly washed with water following which it may be throughly dried, and subsequently mixed with a predetermined quantity of water to produce the freely flowing water containing lignin compositions for use in practising the invention or only partially dried to a moisture content of predetermined degree. Since the lignin is not hygroscopic, it should be kept in a tightly stoppered container once its water content has been adjusted to the desired value.

The following examples illustrate the preparation of suitable lignins both directly from the liquors obtained from the alkaline digestion of lignocellulosic materials and by the dissolving and re-precipitating of otherwise unsuitable lignins.

EXAMPLE 1

Preparation of unoxidized lignin

In accordance with the teachings of United States Patent 2,406,867, black liquor resulting from the alkaline digestion of poplar wood was spray-carbonated at a temperature of 70° C. until a pH of 9.5 was reached with flue gas under conditions such that the maximum dwell time of the liquor in contact with the flue gas was of the order of only 30 minutes to minimize oxidation from the minor content of oxygen in the flue gas. The lignin acid salt which precipitated from the liquid was separated by heating the carbonated liquor at 95° C. at which temperature the precipitate coalesced into a tar which was separated by continuous decantation. The lignin salt was dissolved in hot water to give a solution containing 12% acid precipitatable lignin.

Unoxidized lignin was directly precipitated from this solution at a temperature of 85° C. with vigorous agitation by the continuous addition of this solution to a precipitating medium maintained at a pH of 2.5 by the continuous addition of sulphuric acid. A continuous overflow of the precipitated slurry was after-heated to 95° C. and filtered on a continuous rotary vacuum filter. The product was washed on the filter and then flash dried with hot air at 73.5° C. One hundred parts of the dried product could be mixed with 75 parts of water while yet retaining the characteristics of a free-flowing powder suitable for use as an agent for carrying water into vulcanizable masses in accordance with the present invention.

EXAMPLE 2

Preparation of oxidized lignin

The lignin acid salt solution referred to in Example 1 and containing 12% acid precipitatable lignin was placed in a tank of 11′ 6″ diameter to a depth of 17′ 6″. The tank was equipped with an air distributor at the bottom. The temperature of the liquid was maintained at 70° C. and air at a rate of 200 C. F. M. was bubbled through the solution for 4¾ hours. The pH of the liquid was maintained at 10.0–11.2 during the addition of air by the periodic addition of sodium hydroxide. The lignin was then precipitated from the oxidized liquor and filtered and washed using the same technique and equipment as used for the filtration and washing of the unoxidized lignin of Example 1 with the exception that a precipitating temperature of 95° C. was maintained and the product was after-heated before filtration at super-atmospheric pressure to a temperature of 112° C. The dry oxidized lignin thus produced could be mixed with 125% of its weight of water while still maintaining the characteristics of a free-flowing powder suitable for use in the introduction of water to vulcanizable compositions in accordance with the present invention.

EXAMPLE 3

Preparation of suitable lignins by re-precipitation

One hundred parts of dry lignin (marketed by The Mead Corporation of Chillicothe, Ohio, under the trademark Meadol) was dissolved in 890 parts of water with the addition of 10 parts of sodium hydroxide to convert the lignin to its soluble sodium salt. The solution was heated to 90° C. and dilute hydrochloric acid was then added with vigorous agitation until the pH was lowered to 2.5. The precipitate was filtered and washed on a Büchner funnel and air was sucked through the filter cake until it appeared dry and had the consistency of a freely-flowing powder. Following this a water content determination was made, indicating that the filtered cake contained 68 parts of water per 100 parts of lignin. Milling tests indicated that the filter cake material would mill satisfactorily into rubber compositions in accordance with the process of the present invention. Milling tests with the same lignin prior to treatment in the above manner indicated poor milling qualities whenever the lignin was mixed with an amount of water approaching 50 parts water per 100 parts of lignin.

The above procedure may be used to improve the water carrying abilities of most lignins which, in their initial state, are not capable of carrying sufficient water while remaining freely-flowing powders to be used effectively for purposes of the present invention. It will be appreciated that soluble salts of lignin can be used as the starting material in which case, of course, the addition of alkali may not be necessary for purposes of preparing the solution from which the lignin is to be precipitated. It will be further appreciated, however, that acid soluble lignins, such as lignin sulphonate and the like, cannot be treated satisfactorily by the above method since they do not precipitate from acid solution.

In carrying out the re-precipitation of lignin in the above manner on lignins from various sources, it was found that optimum filtering conditions occurred at different temperatures for each individual type of lignin. It is, therefore, desirable when preparing lignins for use in the present invention using the above procedure to run one or more small scale precipitation tests so that a suitable temperature for precipitation and filtration may be determined for the particular material which is to be treated. A suitable precipitating and filtering temperature is indicated by the formation of a granular precipitate which is not of gelatinous appearance and which does not adhere to the sides of the vessel in which it is precipitated or coagulate in agglomerated lumps.

It will be understood that the lignin which is obtained in accordance with the above examples after filtration and washing but before drying may be used directly for the process of the present invention without any intermediate drying stage. Alternatively, the dried lignin can be slurried in hot water and refiltered, or the water may be added directly to the lignin in a tumbling blender.

In using these lignin compositions for purposes of the invention for introducing water into vulcanizable formulations, a conventional formulation is prepared according to known means and the lignin composition is added in sufficient amount to provide the quantity of water which it is desired to have present. If the ultimate product of vulcanization is to be a substantially unfilled material, it is desirable to use a lignin composition containing a maximum proporton of absorbed water so that the required amount of water will be introduced utilizing the minimum amount of lignin. The lignin itself is inert during the vulcanizing reaction, but it has such a high affinity for rubber and other polymerizable materials that it disperses thoroughly and uniformly throughout the formulation during the milling thereof and carries the water it contains uniformly and thoroughly into intimate contact with the material of the formulation throughout the mass thereof. Since the water-carrying lignin compositions have the physical characteristics of a dry free-flowing powder, no more difficulty is encountered in incorporating them uniformly with their contained water into a mass of vulcanizable material than is encountered in incorporating any conventional dry filler or other material, such for instance as whiting. Moreover, substantially all of the water contained in the ligning compositions is incorporated in the mass so that the amount of water thus incorporated can be controlled with accuracy.

The addition of ordinary lignin to vulcanizable materials is, of course, not new, and its use as a "reinforcer" is well known in the art. The anomaly has been noted, however, that unless the lignin to be used as a "reinforcer" is coprecipitated with the material which is to be vulcanized, the lignin remains inert and has no effect upon the vulcanization. Thus, in some cases, ordinary powdered lignin has been used as a filler from time to time in place of more conventional fillers when its use in this respect has been rendered advantageous from an economical standpoint.

The invention will be understood with greater particularity from a consideration of the data in the following examples and in the drawing wherein Figure 1 is a graph illustrating the effect of lignin-introduced moisture upon the increase in modulus produced.

The examples given below of standard type formulations used in the vulcanization of both natural rubber and GR–S, with and without oxidized lignin as a water carrier, show the effectiveness of lignin as a water carrier and, therefore, as a means of speeding up the rate of vulcanization.

When natural rubber is masterbatched with lignin it is extremely difficult to obtain a satisfactory cure. By the method of the present invention the rate of cure can be markedly increased while at the same time compounds of higher tensile strength are obtained.

EXAMPLE 4

| | Parts by weight | |
|---|---|---|
| | (1) | (2) |
| Natural Rubber (in lignin masterbatch) [1] | 100 | 100 |
| Lignin (in lignin masterbatch) [1] | 50 | 50 |
| Stearic Acid | 2 | 2 |
| Zinc Oxide | 5 | 5 |
| Zimate | 1 | 1 |
| Santocure | 0.5 | 0.5 |
| Sulphur | 2 | 2 |
| Moist Oxidized Lignin [2] | | |
| Lignin content | | 6.8 |
| Moisture content | | 3.2 |
| | 160.5 | 165.5 |
| Percent Moisture, by analysis, on uncured stock | 0.95 | 3.33 |

[1] 150 parts lignin masterbatch (33.3% lignin) consisting of 100 parts rubber and 50 parts lignin.
[2] Contains 32 percent moisture.

TABLE 1

| Cure time at 282° F., minutes | Tensile, p. s. i. | |
|---|---|---|
| | without lignin as a carrier (1) | with lignin as a carrier (2) |
| 10 | 1,520 | 3,340 |
| 20 | 2,210 | 3,200 |
| 30 | 2,715 | 2,960 |
| 40 | 2,805 | 2,780 |

The figures in Table 1 show the increased tensile strength obtained by the incorporation of lignin as a water carrier into the formulation as well as the greatly enhanced rate of cure in the vulcanization of natural rubber. The stock without lignin as a water carrier did not appear to have been completely cured in 40 minutes whereas the stock with the carrier reached its maximum tensile strength in 10 minutes.

This effect with GR–S lignin masterbatch is shown in Example 5.

EXAMPLE 5

| | Parts by Weight | |
|---|---|---|
| | (3) | (4) |
| GR–S (in lignin masterbatch) [1] | 72.2 | 72.2 |
| Lignin (in lignin masterbatch) [1] | 36.1 | 36.1 |
| GR–S [2] | 27.8 | 27.8 |
| Stearic Acid | 2 | 2 |
| Zinc Oxide | 5 | 5 |
| Benzothiazole disulphide (Altax) accelerator (R. T. Vanderbilt Co.) | 1.5 | 1.5 |
| Copper dimethyl dithiocarbamate (Cumate), accelerator (R. T. Vanderbilt Co.) | 0.1 | 0.1 |
| Sulphur | 4 | 4 |
| Moist oxidized Lignin [3] | | |
| Lignin content | | 6.8 |
| Moisture content | | 3.2 |
| | 148.7 | 158.7 |
| Percent Moisture, by analysis, on uncured stock | 1.9 | 3.38 |

[1] 150 parts lignin masterbatch (33.3% lignin) containing 100 parts GR–S and 50 parts lignin.
[2] Added to make rubber equal 100.
[3] Contains 32% moisture.

TABLE 2

| Cure time at 282° F., minutes | Tensile, p. s. i. | |
|---|---|---|
| | without lignin as a carrier (3) | with lignin as a carrier (4) |
| 10 | 1,975 | 2,670 |
| 20 | 2,410 | 2,200 |
| 30 | 2,510 | 2,245 |
| 40 | 2,300 | 2,110 |

The figures in Table 2 also show an increased tensile strength obtained in a much shorter curing time in the presence of lignin as a water carrier in the vulcanization of GR–S.

Moisture-containing lignin can also be used to advantage with GR–S compounds when the reinforcing agent is carbon black, Example 6 indicating the result obtained with channel black.

EXAMPLE 6

| | (5) | (6) | (7) | (8) |
|---|---|---|---|---|
| GR–S | 100 | 100 | 100 | 100 |
| Roegen, plasticizer (Vanderbilt Co.) | 5 | 5 | 5 | 5 |
| Zinc Oxide | 5 | 5 | 5 | 5 |
| Micronex Standard, (Binney & Smith N. Y.) medium processing channel (MPC) black | 50 | 50 | 50 | 50 |
| Benzothiozole disulphide (Altax), accelerator | 1.5 | 1.5 | 1.5 | 1.5 |
| Zinc dimethyl dithiocarbamate | 0.15 | 0.15 | 0.15 | 0.15 |
| Sulphur | 2.0 | 2.0 | 2.0 | 2.0 |
| Moist Oxidized lignin:[1] | | | | |
| Lignin content | | 2.63 | 5.26 | 7.9 |
| Moisture content | | 2.37 | 4.74 | 7.1 |
| | 163.65 | 168.65 | 173.65 | 178.65 |
| Percent Moisture, by analysis, on uncured stock | 0.29 | 1.67 | 2.92 | 3.90 |

[1] Contains 47.4% moisture.

The effect of adding small amounts of lignin and moisture is to markedly increase the tensile strength of the compound as can be seen from a comparison of Formulation 6 with Formulation 5 of Table 3. However, as the quantity of lignin and moisture added to the stock is increased the gain in tensile strength becomes somewhat less (Formulation 7) or may result in a slight loss (Formulation 8) compared with the standard compound. The moisture-containing lignin has the effect of increasing the rate of cure as indicated by the time to reach a given modulus. At the same time an increase in tear strength is observed while the permanent set at break is decreased.

In Example 7 a high abrasion furnace black was used as reinforcing agent for the GR–S and the effect of adding both dry and moist lignin was investigated.

EXAMPLE 7

| | Parts by weight | | |
|---|---|---|---|
| | (9) | (10) | (11) |
| GR–S | 100 | 100 | 100 |
| Philblack O, high abrasion furnace (HAF) black (Phillips Petroleum Co.) | 50 | 50 | 50 |
| Zinc Oxide | 5 | 5 | 5 |
| B. R. T. No. 7, Plasticizer (Barrett Co.) | 6 | 6 | 6 |
| N-cyclohexyl-2-benzothiazole sulfenamide (Santocure), accelerator | 0.7 | 0.7 | 0.7 |
| Sulphur | 2 | 2 | 2 |
| Moist Oxidized lignin:[1] | | | |
| Lignin content | | | 6.8 |
| Moisture content | | | 3.2 |
| Oxidized lignin (moisture free) | | 6.8 | |
| | 163.7 | 170.5 | 173.7 |

[1] Contains 32% moisture.

TABLE 3

| Formulation No. | Cure time in min. at 287° F. | Stress at 300% | Tensile Strength, p. s. i. | Elongation, percent | Shore hardness | Bashore resilience | Perm. set at break, percent | Graves tear, lb./in. |
|---|---|---|---|---|---|---|---|---|
| (5) | 15 | 270 | 715 | 750 | 43 | 33 | 35 | 125 |
| | 30 | 840 | 2,450 | 610 | 56 | 34 | 20 | 215 |
| | 45 | 1,200 | 3,010 | 520 | 59 | 34 | 20 | 242 |
| | 60 | 1,410 | 2,915 | 470 | 62 | 35 | 18 | 240 |
| (6) | 15 | 610 | 2,535 | 750 | 53 | 35 | 25 | 210 |
| | 30 | 1,215 | 2,925 | 650 | 63 | 35 | 15 | 257 |
| | 45 | 1,440 | 3,465 | 500 | 65 | 35 | 15 | 274 |
| | 60 | 1,590 | 2,995 | 480 | 66 | 36 | 12 | 277 |
| (7) | 15 | 720 | 2,780 | 730 | 58 | 35 | 30 | 234 |
| | 30 | 1,200 | 3,050 | 570 | 64 | 35 | 22 | 262 |
| | 45 | 1,440 | 2,965 | 500 | 66 | 36 | 14 | 273 |
| | 60 | 1,510 | 2,825 | 480 | 67 | 36 | 12 | 269 |
| (8) | 15 | 755 | 2,795 | 700 | 59 | 35 | 22 | 235 |
| | 30 | 1,260 | 2,650 | 530 | 67 | 36 | 13 | 267 |
| | 45 | 1,450 | 2,840 | 490 | 68 | 36 | 13 | 265 |
| | 60 | 1,470 | 2,670 | 440 | 68 | 35 | 11 | 260 |

TABLE 4

| Formulation No. | Cure time in min. at 287° F. | Stress at 300% | Tensile strength, p. s. i. | Elongation, percent | Shore hardness | Bashore resilience | Graves tear, lb./in. |
|---|---|---|---|---|---|---|---|
| (9) | 20 | 865 | 3,085 | 540 | 63 | 36 | 245 |
| | 30 | 1,110 | 3,200 | 460 | 65 | 36 | 233 |
| | 40 | 2,190 | 2,780 | 400 | 66 | 37 | 234 |
| | 50 | 2,270 | 2,925 | 380 | 66 | 37 | 230 |
| (10) | 20 | 880 | 1,860 | 570 | 61 | 36 | 230 |
| | 30 | 1,300 | 2,490 | 510 | 65 | 36 | 248 |
| | 40 | 1,670 | 2,685 | 470 | 66 | 36 | 261 |
| | 50 | 1,865 | 2,820 | 440 | 67 | 37 | 247 |
| (11) | 20 | 1,300 | 2,650 | 550 | 64 | 36 | 250 |
| | 30 | 1,545 | 2,875 | 510 | 65 | 36 | 249 |
| | 40 | 1,725 | 3,015 | 480 | 66 | 37 | 245 |
| | 50 | 1,740 | 2,985 | 470 | 67 | 37 | 242 |

It will be noted from Table 4 that the effect of the dry lignin, when added in this manner, is to decrease the tensile strength of the final compound. However, the addition of the moisture-containing lignin results in an improvement in strength compared with the use of moisture-free lignin. The compound with moisture-containing lignin shows a somewhat more rapid cure, as indicated by the time taken to reach a modulus of 1000 lbs. per sq. in. at 300% elongation, than those compounds to which water has not been added. It also shows a steadier modulus as the time of cure is increased, as compared with the standard compound, i. e. "Marching modulus" has been prevented. The elongation at break also remains more constant as the time of cure is increased.

EXAMPLE 8

The effectiveness of lignin as a water carrier on the vulcanization rate of Butadiene-acrylonitrile copolymer (Hycar) is shown.

EXAMPLE 9

The effectiveness of unoxidized lignin as a water carrier is shown.

|  | Parts by weight | |
|---|---|---|
|  | (14) | (15) |
| GR-S | 100 | 100 |
| Reogen | 5 | 5 |
| Zinc Oxide | 5 | 5 |
| Micronex Std. (channel black) | 50 | 50 |
| Altax | 1.5 | 1.5 |
| Methyl zimate | 0.15 | 0.15 |
| Sulphur | 2.0 | 2.0 |
| Moist unoxidized lignin:[1] |  |  |
| Lignin content |  | 3.1 |
| Moisture content |  | 1.9 |
|  | 163.65 | 168.65 |

[1] Contains 38.7% moisture.

| Formulation No. | Cure time in min. at 287° F. | Stress at 300% | Tensile strength, p. s. i. | Elongation at break, percent | Shore hardness | Bashore resilience | Perm. set at break in percent | Graves tear, lb./in. |
|---|---|---|---|---|---|---|---|---|
| (14) | 16 | 310 | 1,005 | 740 | 42 | 33 | 34 | 145 |
|  | 30 | 805 | 2,380 | 620 | 55 | 34 | 20 | 219 |
|  | 45 | 1,175 | 2,975 | 510 | 59 | 35 | 18 | 247 |
|  | 60 | 1,530 | 2,805 | 460 | 62 | 35 | 16 | 240 |
| (15) | 15 | 615 | 2,320 | 740 | 54 | 35 | 26 | 220 |
|  | 30 | 1,235 | 2,910 | 650 | 62 | 35 | 15 | 249 |
|  | 45 | 1,410 | 3,180 | 500 | 65 | 36 | 14 | 281 |
|  | 60 | 1,575 | 2,990 | 470 | 66 | 35 | 12 | 270 |

|  | Parts by weight | |
|---|---|---|
|  | (12) | (13) |
| Hycar OR-25 | 100 | 100 |
| Micronex Std. (channel black) | 50 | 50 |
| Stearic Acid | 1 | 1 |
| Zinc Oxide | 5 | 5 |
| Altax | 1.5 | 1.5 |
| Sulphur | 1.5 | 1.5 |
| Moist Oxidized lignin:[1] |  |  |
| Lignin content |  | 2.4 |
| Moisture content |  | 2.6 |
|  | 159.0 | 164.0 |

[1] Contains 52% moisture.

TABLE 5

| Formulation No. | Cure time in min. at 310° F. | Stress at 300% | Tensile strength, p. s. i. | Elongation at break, percent | Shore hardness | Bashore resilience |
|---|---|---|---|---|---|---|
| (12) | 10 | 1,040 | 3,760 | 520 | 67 | 10 |
|  | 20 | 2,634 | 3,510 | 380 | 70 | 10 |
|  | 30 |  | 3,190 | 290 | 71 | 10 |
|  | 40 |  | 2,875 | 280 | 71 | 10 |
| (13) | 10 | 2,170 | 3,435 | 440 | 69 | 10 |
|  | 20 | 2,730 | 3,370 | 370 | 71 | 10 |
|  | 30 | 2,995 | 3,175 | 310 | 71 | 10 |
|  | 40 |  | 2,895 | 270 | 71 | 10 |

It will be observed from Table 5 that the rate of cure has been speeded up by incorporation of moisture by means of the lignin as a water carrier. The modulus obtained in a given curing time has been markedly increased in the presence of water.

It is shown in Table 6 that the effectiveness of unoxidized lignin as a water carrier is similar to that of oxidized lignin as a water carrier.

The improvement in the vulcanization of rubber both natural and synthetic is illustrated in the foregoing examples. It results from the fact that liginn will carry water into the compounded stock with ease. The water-carrying lignin is added with no more difficulty, than that experienced in the addition of a dry powder. No tendency to porosity has been observed in this process.

Lignin, as a water carrier, permits the reduction of organic accelerator in the formulation. Better physical properties are obtainable than would result from increased organic acceleration, and the rate of cure can be more accurately controlled through the control of moisture.

The following example illustrates the effect of water introduced according to the invention upon rate of cure and upon physical characteristics of the product contained in a typical formulation.

EXAMPLE 10

*Base formulation*

| | Parts by weight |
|---|---|
| GR-S | 100 |
| Reogen | 5 |
| Zinc oxide | 5 |
| Micronex std | 50 |
| Altax | 1.5 |
| Zimate | 0.15 |
| Sulphur | 2.0 |
| Oxidized lignin: | |
| Lignin content | 5.0 |
| Moisture content | Variable |

Varying quantities of moisture were added to the above formulation by means of lignin used as a moisture carrier.

In each mixing the quantity of dry lignin was kept constant, and the moisture was varied by changing the moisture content of the lignin. In this way the only difference between the mixings was in the amount of moisture added.

The various mixings were cured for 15, 30, 45 and 60 minutes at 287° F., and the effect of moisture was estimated from the average modulus for the four cures.

Figure 1 shows percent moisture in the lignin, plotted against percent increase in average modulus. Five percent moisture in the lignin shows a small or negligible increase. Between 15 and 25% moisture there is a considerable increase in modulus and beyond 25% the increase tapers off.

What we claim as our invention is:

1. In the compounding of sulphur vulcanizable rubbery diene polymers and in which it is desired to have present during vulcanization a controlled percentage of water, the improvement which consists in; incorporating a predetermined amount of water required to produce said controlled percentage in the rubbery diene polymer in a finely divided substance selected from the group consisting of unoxidized lignin which has been isolated by precipitation at a temperature of from about 50 to about 80° C. from the aqueous liquors obtained from the alkaline digestion of lignocellulosic material and oxidized lignin which has been isolated by precipitation at a temperature of from about 70 to about 100° C. from the aqueous liquors obtained from the alkaline digestion of lignocellulosic material, so as to form a freely flowing powder of said water and said substance which contains from about 15 to about 150% by weight moisture; and then dry milling the thus formed powder into said elastomer composition whereby said water is carried into said composition and is available therein during vulcanization thereof.

2. The improvement defined in claim 1 wherein the substance is unoxidized lignin.

3. The improvement defined in claim 1 wherein the substance is oxidized lignin.

References Cited in the file of this patent

UNITED STATES PATENTS

| | | |
|---|---|---|
| 2,572,884 | Pollak et al. | Oct. 30, 1951 |
| 2,608,537 | Pollak | Aug. 26, 1952 |
| 2,610,954 | Raff et al. | Sept. 16, 1952 |
| 2,760,943 | Sohn | Aug. 28, 1956 |

OTHER REFERENCES

Paper Trade Journal, April 1, 1953, volume 116, No. 13, TAPPI Section, pages 135–136.